United States Patent
Marduel

(10) Patent No.: US 7,534,473 B2
(45) Date of Patent: May 19, 2009

(54) PROCESS FOR IMPREGNATING A FIBROUS, FILAMENTARY AND/OR POROUS NETWORK WITH POWDER USING ELECTRODES SUBJECTED TO AN AC ELECTRIC FIELD

(75) Inventor: Joric Marduel, Chazay d'Azergues (FR)

(73) Assignee: Materials Technics Holding S.A., Luxembourg (LU)

(*) Notice: Subject to any disclaimer, the term of this patent is extended or adjusted under 35 U.S.C. 154(b) by 449 days.

(21) Appl. No.: 11/408,082

(22) Filed: Apr. 20, 2006

(65) Prior Publication Data
US 2006/0233966 A1  Oct. 19, 2006

Related U.S. Application Data

(63) Continuation of application No. PCT/IB2004/003427, filed on Oct. 18, 2004.

(30) Foreign Application Priority Data
Oct. 21, 2003  (EP) .................................. 03292607

(51) Int. Cl.
*B05D 1/04* (2006.01)
(52) U.S. Cl. .................. 427/482; 427/458; 427/474
(58) Field of Classification Search .................. None
See application file for complete search history.

(56) References Cited

U.S. PATENT DOCUMENTS

| | | | |
|---|---|---|---|
| 2,730,455 A | 1/1956 | Swann | |
| 3,919,437 A | 11/1975 | Brown | |
| 5,895,622 A | 4/1999 | Duvall et al. | |
| 6,733,845 B1 * | 5/2004 | Caramaro et al. | 427/477 |
| 2003/0143315 A1 * | 7/2003 | Pui et al. | 427/2.1 |

FOREIGN PATENT DOCUMENTS

| | | |
|---|---|---|
| EP | 0179688 | 4/1986 |
| EP | 0914916 | 5/1999 |
| WO | WO 99/22920 | 5/1999 |
| WO | WO 02/30657 | 4/2002 |

* cited by examiner

*Primary Examiner*—Frederick J Parker
(74) *Attorney, Agent, or Firm*—Sturm & Fix LLP

(57) ABSTRACT

The invention relates to a novel electric powder impregnation process for impregnating powder into a fibrous, filamentary and/or porous network, especially in order to produce a composite, comprising a continuous, rigid or flexible, matrix with which said network is in intimate contact, in which process the powder on the one hand and said network on the other are placed between a lower electrode and an upper electrode, these electrodes are electrically insulated from each other by a dielectric and connected to the respective poles of an AC generator so as to simultaneously subject the powder and said network to an electric field, characterized in that the upper electrode comprises at least one electrode tube and the AC electric field applied is from 0.10 to 20 kV/mm.

10 Claims, 2 Drawing Sheets

PROCESS FOR IMPREGNATING A FIBROUS, FILAMENTARY AND/OR POROUS NETWORK WITH POWDER USING ELECTRODES SUBJECTED TO AN AC ELECTRIC FIELD

CROSS REFERENCE TO RELATED APPLICATIONS

This application is a continuation of PCT/IB04/03427 filed Oct. 18, 2004, claiming priority of European Application No. 03292607.3 filed Oct. 21, 2003, and are both included in their entirety by reference made hereto.

BACKGROUND OF THE INVENTION

1. Field of the Invention

The present invention relates to a novel process for impregnating a fibrous, filamentary and/or porous network with powder, especially in order to produce a composite comprising a continuous, rigid or flexible, matrix with which said network is in intimate contact.

2. Description of the Related Art

Composites reinforced by fibers embedded in thermoplastic or thermosetting matrices are an extremely interesting class of materials, allowing in particular the production of materials exhibiting excellent mechanical properties for masses substantially less than those of metals. Furthermore, these materials are obtained by simple molding, after having coated the reinforcing fibers or filaments with the resin intended to form the matrix of the composite. Of course, the mechanical properties of the composite thus obtained depend on the quality of the interface between the reinforcing fibers or filaments and the matrix.

This therefore assumes that there is good cohesion between the fibers or filaments and the matrix. Two factors essentially determine this cohesion: these are, on the one hand, the adhesion properties between the resin and the reinforcing fibers or filaments, that is to say the selection of the material intended to form the matrix, and, on the other hand, the void fraction inside the composite. This second factor results of course from the ability of the resin to infiltrate between the fibers and the filaments of the fibrous mass. This is because each fiber or filament or each fiber or filament portion that is not coated with the matrix does not contribute or contributes only partly to the mechanical properties of the composite. Consequently, the higher the void content the lower the mechanical properties of the composite.

Fibrous materials used for acoustic or thermal insulation are produced by bonding the fibers constituting a nonwoven at the point of intersection between the fibers with an adhesive or hot-melt adhesive. These materials may be produced by passing the nonwoven through a bath of adhesive or by using hot-melt adhesive fibers or powders. The difficulty in the case of hot-melt adhesive powders is that it requires the use of a process allowing the powders to be distributed at the points of intersection of the fibers, in order to optimize bonding, while limiting the amount of powder used.

Functional textile materials require the introduction of an active (bactericidal, fireproofing, superabsorbent, etc.) principle into the base textile. This active principle may be in the form of liquid solutions or in the form of dry powders with which the textile substrate will have to be impregnated. The case of active principles in liquid form has the drawback of requiring a substantial consumption of energy in order to be able to dry them, while evaporating the solvent from the solution. Powders do not have this type of problem, but they are sometimes difficult to distribute uniformly and definitively within the base textile.

WO 99/22920 discloses a process for impregnating powder into a fibrous or filamentary network, characterized in that the powder on the one hand and said network of fibers or filaments on the other are placed in an electric field whose AC voltage is at least 5 kV for a time of at least 2 s. That document discloses, as electrodes, two superposed parallel metal plates connected to the two respective poles of an electric generator, the respective faces of which, facing each other, are covered with a dielectric plate, for example a glass ceramic plate.

That process has many advantages, but it is ill-suited to the impregnation treatment of large articles, for example those from 0.80 to 7.00 m in width, in particular when the continuous treatment is carried out with a material running between the electrodes. This is because any geometrical distortion of the electrodes results in variations in the distance between them, which degrades the uniformity of the electric field and therefore the quality of powder impregnation. To avoid this geometrical distortion, the lower metal plate electrode may be placed on a stand; however, the upper metal plate electrode and the dielectric that covers it therefore have to be stiffened, for example by transverse bars, which may impair the operation of the electrodes.

BRIEF SUMMARY OF THE INVENTION

The object of the present invention is to propose a process for impregnating powder into a fibrous, filamentary and/or porous network using an AC field, which is suitable for the continuous impregnation of large articles, for example those at least 0.80 m, in particular 1.20 to 7.00 m, in the direction perpendicular to the direction in which the article to be impregnated runs, without having the aforementioned drawbacks.

This object is achieved by the invention as defined by the set of claims appended hereto.

The invention relates to an electric powder impregnation process for impregnating powder into a fibrous, filamentary and/or porous network, especially in order to produce a bonded or functional composite, comprising a continuous, rigid or flexible, matrix with which said network is in intimate contact, in which process the powder on the one hand and said network on the other are placed between a lower electrode and an upper electrode, these electrodes are electrically insulated from each other by a dielectric and connected to the respective poles of an AC generator so as to simultaneously subject the powder and said network to an electric field, characterized in that the upper electrode comprises at least one electrode tube and the AC electric field applied is from 0.10 to 20 kV/mm.

One of the poles of the AC generator is the phase pole and the other is the neutral pole, in general connected to the ground for safety reasons, especially when the AC generator is a high-voltage generator.

Correct operation of the process requires the application of an AC electric field of 0.10 to 20 kV/mm to the material to be impregnated. The requirement for a high electric field in order to move the powder particles means in general that a high-voltage AC generator has to be used. This generator may consist of one or more high-voltage transformers capable of raising the voltage delivered by a primary variable-voltage supply, which may itself consist of an autotransformer. The function of this primary variable-voltage supply is to adjust the voltage that will be raised by the transformer, so as to constitute a variable-voltage AC high-voltage generator. One solution also consists in using electronic devices to produce all or part of this high-voltage generator. The frequency of this high-voltage generator can be varied so as to optimize the impregnation performance depending on the nature and the particle size of the powder to impregnate. This frequency may vary within a range from 1 Hertz to 1000 Hertz depending on the case.

The waveform of the electrical signal applied to the electrodes also has an influence on the powder impregnation. Square, sinusoidal or triangular signals may be employed, and signals of more complex waveform. In general, a 50 or 60 Hz sinusoidal signal voltage is used, so as to use an inexpensive high-voltage generator.

The electrodes consist of highly conducting elements in order to guarantee an equivalent voltage at every point on their surface and to minimize heating losses. Metals such as, for example, copper, aluminum, silver or gold are advantageously indicated for this.

An insulation system, also called a dielectric system, generally covers at least one of the electrodes so as to form an electrical insulation for limiting the current between the electrodes and for preventing the appearance of an electric arc constituting a short circuit when an electric field above the dielectric strength of air is used. In the design or production of electrical equipment, the use of insulating materials is a source of many problems. One of the main causes of failure is in fact the breakdown of the insulation. This is because, when an insulator is subjected to high (electrical, thermal or mechanical) stresses, local non-neutral areas appear on the surface and/or in the volume which modify the electrical state of the material and induce an internal residual field distribution. The accumulation of space charge may cause degradation of the material and result in breakdown of the insulator.

The insulators used in the process must have a high dielectric strength and exhibit good aging behavior. Materials such as quartz, glass or ceramic exhibit characteristics that are useful for forming this dielectric. These materials allow little space charge to accumulate when they are subjected to an electric field. Quartz is of particular value as a dielectric insulator as it has a high dielectric strength and good aging behavior.

The thickness of the dielectric depends on the level of electric field applied to the electrodes. Dielectric thicknesses from 1 mm to 20 mm are suitable, thicknesses between 2 and 5 mm being preferred.

Depending on the levels of field applied to the material, it is possible to insulate a single electrode pole or both poles. Maximum insulation will be obtained with a dielectric insulator on both electrode poles. For materials that can be impregnated using an electric field below the breakdown voltage of air, it is possible for the air to be used directly as insulator between the metal electrodes. The conveyor belt may also be chosen to act as a dielectric, with a sufficient safety margin as regards the risk of an electric arc.

The use of resins highly filled with metal particles (silver lacquer for example) allows direct production of a coating serving as electrode on the surface of the dielectric insulator. Likewise, the use of metal films covered with adhesive allows the electrode to be applied directly to the dielectric insulator without having an air layer between the electrode and the dielectric. Another particularly advantageous solution consists in directly metallizing the dielectric insulator using one of the various metallization techniques well known in the art (PVD or CVD vacuum metallization, chemical metallization, etc.). Here again, the absence of an air layer between the electrode and the dielectric insulator is favorable in order to prevent electrical microdischarges between the two elements.

According to the invention, the upper electrode comprises at least one electrode tube. Any deformation at the center of this electrode is thus greatly reduced, thereby making it possible to carry out treatments over large widths of at least 0.80 m, particularly 1.20-7.00 m. The conventional layout of electrodes is perpendicular to the direction of movement of the product to be treated. Other layouts may be used with electrodes orientated from 0 to 90° compared with the conventional layout. The interest of a layout that is not perpendicular to the direction of movement is the possibility of using electrodes that are shorter than the width of the substrate to be treated, notably when the latter has a large width.

The electrode tube or tubes may have a circular or rectangular cross-section, or one of another shape, allowing a uniform field to be applied. That cross-section may also have a more complex shape that allows punctually concentrating the field lines, thereby enhancing the impregnating capacity of the set up. The electrode tubes generally consist of a dielectric and of a metal part.

Particularly advantageous electrode tubes are internally metallized hollow dielectric tubes, in particular internally metallized hollow quartz tubes. Metals, such as copper, aluminum, silver or gold for example, may be used for this metallization.

BRIEF DESCRIPTION OF THE DRAWINGS

Various configurations may be used to arrange these tubes and to apply an electric field to the product to be impregnated (cf.

DETAILED DESCRIPTION OF THE INVENTION

Figure 1:
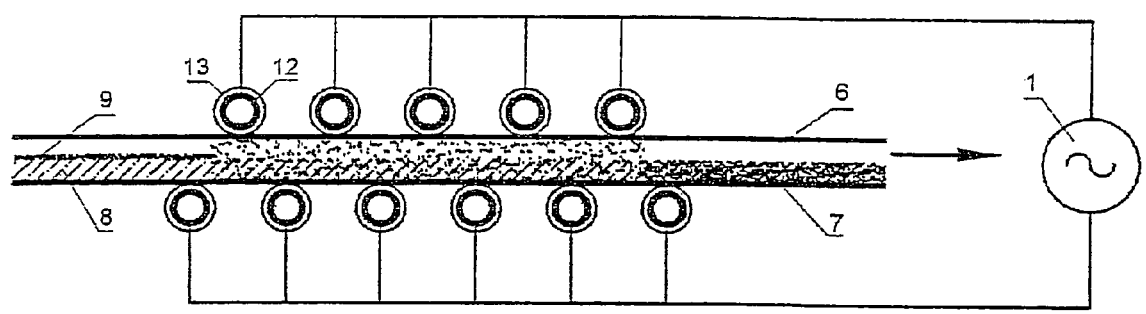
FIGS. 1 to 4 described below). In advantageous electrode configurations:
- the upper and lower electrodes consist of metallized hollow circular dielectric tubes in an offset configuration of these tubes (FIG. 1) or in a configuration in which these tubes face one another (FIG. 2);
- the upper and lower electrodes consist of metallized hollow rectangular dielectric tubes in a configuration in which these tubes face one another (FIG. 3);
- the lower electrode is a rectangular plate and the upper electrode consists of metallized hollow circular dielectric tubes (FIG. 4).

A larger or smaller spacing between the tubes of the same potential may be adopted depending on the materials, on the run speed and on the desired impregnation time. The maximum impregnation rates are obtained with a very small spacing between the tubes at the same potential.

To obtain the impregnation effect, it is necessary to apply the AC electric field for a sufficient time. This depends especially on the nature of the fibrous, filamentary and/or porous network and of the powder, and on other parameters of the process, in particular the intensity and frequency of the AC field, the waveform of the signals, and the configuration and dimensions of the electrodes. This sufficient time will be easily determined by a person skilled in the art, by routine experiments. In general, it is at least 1 s, often at least 2 s, and in particular at least 5 s.

Prior Powder Dusting

A prior step of the process consists in dusting the top of the fibrous, filamentary or porous substrate with the impregnation powder. The material, thus consisting of the substrate covered with the powder, may be introduced into the process so as to make the powder penetrate its substrate. In certain cases, and especially when the substrate is very thick or not very porous, it is possible to produce a powder dusting both on the top of the substrate and/or on the bottom by powder-dusting all or part of the lower belt used to introduce the material into the process.

The powder dusting is generally carried out over the entire surface of the substrate to be impregnated. In certain cases, it is possible to use localized powder dusting or to use a stencil in order to impregnate only certain areas of the substrate. This effect may be desired when parts are cut out in the final use of the product. In this case, localized impregnation avoids unnecessary loss of powder in the material scraps, which can thus be recycled. This localized impregnation effect may also be desired in order to obtain different characteristics over the areas of the final product (reinforcement at discrete points, localized treatment, etc.).

Conveyor Belts

The process may be used for impregnation of a continuously running product by using two conveyor belts made of insulating materials, such as glass cloth or polymers covered with polytetrafluoroethylene, polyurethane or silicon for example. These two conveyor belts are used to sandwich the product to be impregnated, preventing dispersion of the powder and preventing the accumulation of powder on the surface of the electrodes. Using two conveyor belts also makes it possible to keep the powder confined on the top of the fibrous network during entry of the product between the electrodes. Otherwise, the powder would be expelled outward by the electric field.

Devices for cleaning the conveyor belts at the end of the machine are used to recover the powder that might have remained on the surface of the belts. These cleaning systems may employ brushes and suction systems. In all cases, a collector is used to recover the powder for the purpose of being able to reintroduce it upstream of the process (to powder-dust the fibrous, filamentary and/or porous network).

Other features and advantages of the present invention will become apparent from the following description, which is given in conjunction with the appended drawings that illustrate, schematically and by way of example, the implementation of the process of the invention using four electrode configurations.

FIG. 1 shows a device in which the upper and lower electrodes consist of hollow circular quartz tubes 13 that are metallized (at 12), in an offset (staggered) configuration of these tubes.

Figure 2:
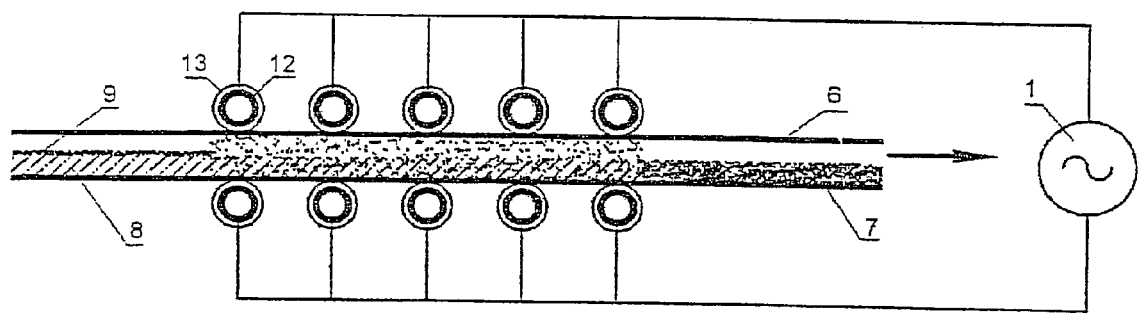

FIG. 2 shows a device in which the upper and lower electrodes consist of hollow circular quartz tubes 13 that are metallized (at 12), in a configuration in which these tubes face one another.

Figure 3:
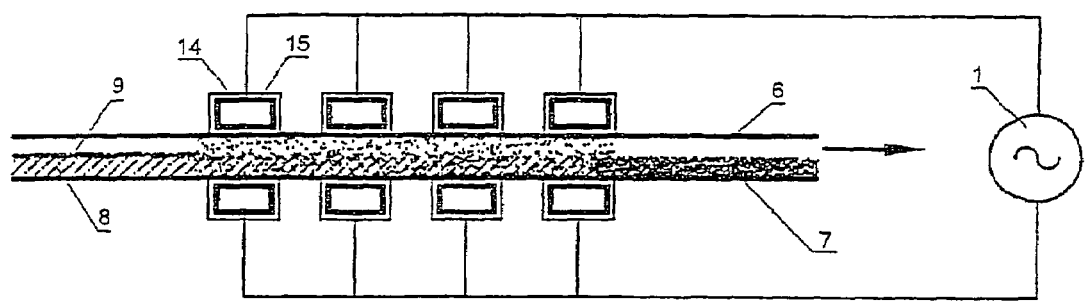

FIG. 3 shows a device in which the upper and lower electrodes consist of hollow rectangular quartz tubes 14 that are metallized (at 15) in a configuration in which these tubes face one another.

Figure 4:
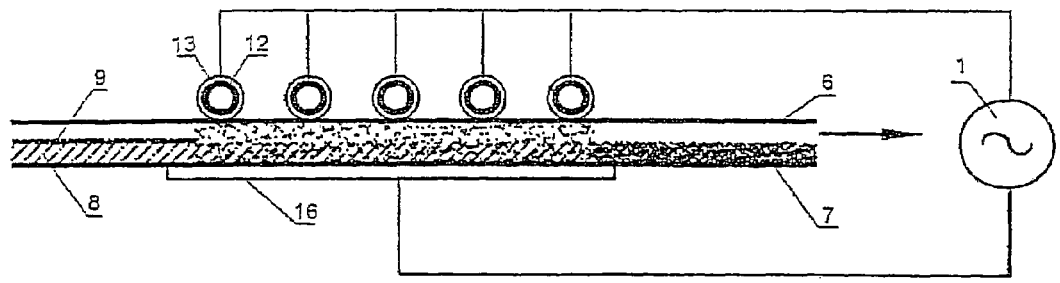

FIG. 4 shows a device in which the lower electrode is a rectangular plate 16 that is not covered with dielectric (and placed on a stand, not shown) and the upper electrode consists of hollow circular quartz tubes 12 that are metallized (at 13).

In the device of each of the figures, the surface of the fibrous, filamentary and/or porous material 8 is precoated with powder 9 before being continuously introduced into the impregnation process by means of two conveyor belts 6 and 7. The high-voltage generator 1 is connected to the upper and lower electrodes. The powder is subjected to the action of the AC electric field, which makes the powder impregnate the fibrous, filamentary and/or porous network, that is to say penetrate the available spaces therein. After exiting the applicator, the impregnated material can be used for its final application (molding of a composite, thermosetting of insulation materials, etc.).

The device of FIG. 1 produces a relatively uniform electric field across the product to be impregnated.

The device of FIG. 2 produces an electric field with maxima between the facing electrode tubes and minima at the middle of the space separating the electrode tubes. Advancing the product between the conveyor belts amounts to subjecting the product to an AC electric field of variable maximum amplitude, with minima and maxima. This may be of particular advantage for certain materials.

The device of FIG. 3 produces a particularly uniform electric field across the product to be impregnated, similar to that observed with flat electrodes, this being more uniform the smaller the separation between the rectangular electrode tubes.

The device of FIG. 4 also produces an electric field with maxima and minima.

The process of the invention can be used to impregnate various fibrous, filamentary and/or porous networks or substrates with powders of different type and having different chemical, functional and geometrical characteristics.

Powder

Various types of powder may be used in the process of the invention. The nature of these powders varies according to the desired final applications. Powders of insulating nature are the simplest to use, although it has been demonstrated that a conducting powder can also be electrically charged and thus can impregnate a fibrous network by the action of the AC electric field. As a general rule, powders based on organic polymers, and also mineral powders, function well and are often used in the process. The particle size is the key parameter in the selection of a powder. Trials carried out have allowed impregnation with powders whose particle size varies from 0.1 to 500 µm. In all cases, the particle size of the powder must be compatible with the porosity of the fibrous or porous network in order to impregnate the network.

It is also possible to use blends of several powders impregnated at the same time, the chemical nature or the geometrical characteristics of which are complementary for the final use of the material.

Substrates to be Impregnated

The fibrous, filamentary and/or porous networks may be nonwovens, wovens, knits, papers, leather, wood fibers, mineral fibers, notably nonwovens in ceramic fibers, glass fibers or basalt fibers, foams, notably open foams, e.g. foams of composite or non-composite polymers (polystyrene, styrenic polymers, PVC, polyurethanes, phenolic polymers, silicones, polyolefines, other thermoplastic and thermosetting polymers, rubbers and elastomer thermoplastic polymers, etc . . . ) and mineral foams, or any structures having sufficient porosity to allow powder diffusion by the action of the AC electric forces.

Functional Materials

This process may be used for impregnation with functional powders, such as soaps, superabsorbents and fireproofing powders, which will allow the thus impregnated substrate to be used as a functional product in various end applications (hygiene, cosmetics, transport vehicles, buildings, etc.). In these various cases, the amount of powder to impregnate may vary from 0.2% to 100% of the mass of substrate depending on the desired effects. In certain cases, a subsequent setting technique, to set the impregnated powders, may be required in order to allow the product formed to retain its final characteristics.

Bonded (Consolidated) Materials

This process can also be used to impregnate the fibrous or porous network with binding or bonding powders. In this case, the powder will be distributed within the substrate so as to allow the network to be set in the desired geometry. To do this, a subsequent thermal setting step may be required in order for the powder to adhere to the network and for the structure to be maintained in the desired configuration. The amount of binding or bonding powder used in this type of application may vary from 0.5 to 30% of the mass of the substrate, depending on the desired characteristics. The nature of the powders used for these applications may be that of the family of polyurethanes, copolyesters, copolyamides and various thermoplastics and thermosets exhibiting adhesion or bonding characteristics.

Fiber-Reinforced Composites

This process can also be used to produce reinforced materials comprising a continuous, rigid or flexible, matrix in contact with the fibrous or porous network. In this case, the powder constitutes the matrix that will provide the fibrous networks with very high mechanical properties allowing the impregnated products obtained to be used as composites. The powders used may have thermoplastic characteristics, such as in the case of polypropylene or polyethylene for example, or thermosetting characteristics, such as with phenolic or epoxy powders for example. The amounts of powder required to produce these impregnated materials varies from 5% to 200% of the initial mass of the substrate. These impregnated materials require a subsequent forming step, which may be carried out, for example, by hot pressing.

We will now examine a few examples of materials produced using various woven and nonwoven substrates and various thermoplastic, thermosetting and functional powders using the process of the invention carried out with devices comprising various electrode configurations.

EXAMPLE 1

This example was produced with a nonwoven made of natural hemp fibers, weighing 1000 g/m$^2$ and being 9 mm in thickness, and with thermosetting powder of the Bakelite brand, reference 6171TP, having a particle size of less than 100 μm. The upper face of the nonwoven was precoated with 500 g/m$^2$ of powder.

The whole assembly was then introduced into the impregnation process between two belts at a rate of 2 meters per minute. The electrodes used were tubular electrodes 30 mm in outside diameter, which were placed facing one another. The space separating the upper and lower electrodes was 10 mm between dielectrics. The space between two tubular electrodes of the same potential was 15 mm, i.e. 23 electrodes on each side for a treatment length of 1 meter. A field of 3 kV/mm was applied between the belts in the space where the material to be impregnated was. A residence time of 30 seconds in the machine allowed the nonwoven to be uniformly impregnated with powder.

After impregnation, the material obtained was hot-pressed at 190° C. for 1 minute with a pressure of 5 bars so as to obtain a composite. This material, 2 mm in thickness after pressing, had a mean flexural elastic modulus of 4000 MPa.

EXAMPLE 2

This example was produced with a viscose/polyester spun lace nonwoven weighing 100 g/m$^2$. The surface of the nonwoven was precoated with superabsorbent powder of reference JB 882 from SNF, the powder having a particle size of less than 100 μm.

The speed of the belts allowing the material to be introduced into the impregnation machine was 4 m/min. The impregnation time was therefore 15 seconds in order to impregnate the superabsorbent into the nonwoven. The electrodes used were tubular electrodes 30 mm in outside diameter in the case of the upper electrode and a flat electrode coated with a 4 mm thick dielectric in the case of the lower electrode. The space separating the upper and lower electrodes between dielectrics was 5 mm. The space between two upper tubular electrodes was 15 mm, i.e. 23 electrodes. The dimensions of the lower flat electrode were 1 m×1 m. The electric field applied to the product was 4 kV/mm.

It was found that the impregnating powder positioned itself between the fibers, thereby allowing the impregnated material to be handled without significant loss of powder being observed.

The final absorptivity of the product obtained made it possible to absorb an amount in excess of 1500 g/m$^2$ of a saline solution containing 0.9 g/l of NaCl after immersion in said solution for 25 minutes.

EXAMPLE 3

The objective of this example was to thermally set a polyester nonwoven after carding so as to provide it with sufficient mechanical strength for it to be handled and transported. The nonwoven was a 400 g/m$^2$ polyester, which was carded and formed into a web with a thickness of 50 mm. The thermal bonding powder used was a copolyamide powder having a particle size of 80-200 μm obtained from Abifor.

After the phase of powder-dusting the surface of the nonwoven, the material was compressed to 30 mm between the belts so as to be introduced into the impregnation machine. The electrodes used were tubular electrodes 30 mm in outside diameter, which were arranged in a staggered fashion. The space between two tubular electrodes of the same potential was 15 mm, i.e. 23 electrodes on each side for a treatment length of 1 meter. A speed of 2 m/min was used, i.e. an impregnation time of 30 seconds; this allows all of the thermal bonding powder to be dispersed within the volume of the nonwoven.

The electric field applied to the material was 2 kV/mm.

A subsequent thermal setting step was carried out in an oven at a temperature of 140° C. for 3 minutes, so as to obtain a material exhibiting good mechanical strength and good toughness so as to be used as thermal insulation.

EXAMPLE 4

A material serving as acoustic insulation was produced by impregnating a nonwoven based on recycled cotton fibers with phenolic thermosetting resin powders. The nonwoven was obtained from recycled cotton fibers, which were formed into a web so as to obtain a specific weight of 500 g/m$^2$. The surface of the nonwoven was dusted with phenolic powder, with the reference 6993TP from Bakelite, before introduction into the impregnation machine. The electrodes used were tubular electrodes 30 mm in outside diameter, which were arranged so as to face one another. The space separating the upper and lower electrodes was 15 mm between dielectrics. The space between two tubular electrodes of the same potential was 15 mm, i.e. 23 electrodes on each side for a treatment length of 1 meter. A field of 2.5 kV/mm was applied between the belts in the space in which the material to be impregnated lay. A treatment time of 30 seconds in the machine allowed the powder to be uniformly impregnated into the nonwoven.

After impregnation, the material obtained was hot-pressed at 180° C. for 2 minutes with a space of 10 mm so as to obtain a material exhibiting good acoustic properties.

EXAMPLE 5

This example was produced by impregnating a 500 g/m² cotton knit with an epoxy/polyester powder, reference 2000/09 from Dakota-Coating. The knit was predusted with a 100 g/m² quantity of this powder before the whole assembly was introduced into the impregnation machine. The electrodes used were tubular electrodes 30 mm in outside diameter in the case of the upper electrode and a flat electrode covered with a 4 mm dielectric in the case of the lower electrode. The space separating the upper and lower electrodes between dielectrics was 5 mm. The space between two upper tubular electrodes was 15 mm, i.e. 23 electrodes for a treatment length of 1 meter. The dimensions of the flat lower electrode were 1 m×1 m. An electric field of 2.5 kV/mm was applied to the product to be impregnated. A time of 15 seconds allowed uniform powder impregnation between the fibers.

A subsequent step for thermoforming the knit, by heating it to 170° C. in a mold, gives it its final shape.

EXAMPLE 6

An open foam of 330 g/m² polyurethane polymer of medium porosity and thickness 11 mm, was prepared. The upper face was powdered, at 40% by mass compared with the final mass, with a mineral powder having a particle size inferior to the porosity of the open foam substrate. The electrodes used were tubular electrodes of outside diameter 30 mm, which were placed facing one another, with an inter-electrodes space of 15 mm.

The impregnation process of the invention is then carried out with an AC voltage of 30 kV and a distance between electrodes of different polarity of 30 mm during 30 seconds.

An open foam polyurethane material that is homogeneously impregnated with mineral powder is thus obtained.

EXAMPLE 7

A 40 g/m² paper for medical use of porosity 57 c is used. An expansive powder of particle size 6 to 9 μm (Expancel 461 DU 20, Akzo Nobel) is uniformly dusted at an amount of 10% mass compared with the final mass. The electrodes used were tubular electrodes 30 mm in outside diameter, which were placed facing one another, with an inter-electrodes space of 15 mm.

The impregnation process of the invention is then carried out with an AC voltage of 25 kV and a distance between electrodes of different polarity of 4 mm during 30 seconds.

A material in which the expansive powder is uniformly distributed in the paper volume is thus obtained. A thermal treatment at 200° C. is then performed, which causes effective expansion of the powder particles (up to 50 μm), and their thermofixation in the paper structure.

EXAMPLE 8

A 1700 g/m² nonwoven needled ceramic (aluminum silicate) fibers, resistant to high temperatures, and having a 30 mm thickness is used.

A thermobonding high density polyethylene HDPE powder (Dakota Coatings HDPE T1 0-80 μm) is uniformly dusted at an amount of 20% mass compared with the final mass.

The electrodes used were tubular electrodes 30 mm in outside diameter, which were placed facing one another, with an inter-electrodes space of 15 mm.

The impregnation process of the invention is then carried out with an AC voltage of 50 kV and a distance between electrodes of different polarity of 30 mm during 45 seconds.

A thermal treatment is then performed, to fuse the HDPE particles that are homogeneously distributed in the nonwoven volume (Oven temperature: 170° C.). A thermobonded ceramic fibers material is thus obtained.

The invention claimed is:

1. An electrical powder impregnation process for impregnating powder into a fibrous, filamentary and/or porous network, especially in order to produce a bonded or functional composite, comprising the steps of:
   providing a continuous, rigid or flexible, matrix with which said network is in intimate contact;
   placing the powder and said network between a lower electrode and an upper electrode, wherein these electrodes are electrically insulated from each other by a dielectric and connected to the respective poles of an AC generator so as to simultaneously subject the powder and said network to an electric field;
   wherein the upper electrode comprises at least one hollow electrode tube and the AC electric field applied is from 0.10 to 20 kV/mm.

2. The process as claimed in claim 1, wherein the electrode tube or tubes are internally metallized hollow dielectric tubes.

3. The process as claimed in claim 1, wherein the dielectric is selected from quartz, glass and ceramic.

4. The process as claimed in claim 1, wherein the electrode tube or tubes are internally metallized hollow quartz tubes.

5. The process as claimed in claim 1, wherein the electrode tubes have a circular cross section.

6. The process as claimed in claim 1, wherein the electrode tubes have a rectangular cross section.

7. The process as claimed in claim 1, wherein the upper and lower electrodes consist of metallized hollow circular dielectric tubes in an offset configuration of these tubes.

8. The process as claimed in claim 1, wherein the upper and lower electrodes consist of metallized hollow circular dielectric tubes in a configuration in which these tubes face one another.

9. The process as claimed in claim 1, wherein the upper and lower electrodes consist of metallized hollow rectangular dielectric tubes in a configuration in which these tubes face one another.

10. The process as claimed in claim 1, wherein the lower electrode is a rectangular plate and the upper electrode consists of metallized hollow circular dielectric tubes.

* * * * *